(12) United States Patent
Dona Contero et al.

(10) Patent No.: US 7,396,183 B2
(45) Date of Patent: Jul. 8, 2008

(54) CONNECTING ELEMENT

(75) Inventors: Juan M. Dona Contero, Barcelona (ES); David Alonso Gras, Sant Cugat del Vallés (ES)

(73) Assignee: Fico Cables, S.A., Mollet del Valles (ES)

( * ) Notice: Subject to any disclaimer, the term of this patent is extended or adjusted under 35 U.S.C. 154(b) by 0 days.

(21) Appl. No.: 10/495,860

(22) PCT Filed: Nov. 21, 2002

(86) PCT No.: PCT/EP02/13083

§ 371 (c)(1),
(2), (4) Date: Feb. 28, 2005

(87) PCT Pub. No.: WO03/044377

PCT Pub. Date: May 30, 2003

(65) Prior Publication Data

US 2005/0175398 A1    Aug. 11, 2005

(30) Foreign Application Priority Data

Nov. 21, 2001   (DE)   ................. 101 56 987

(51) Int. Cl.
*F16C 11/00*   (2006.01)
(52) U.S. Cl. ..................... 403/122; 403/329
(58) Field of Classification Search ......... 403/122–144, 403/329; 180/315, 325
See application file for complete search history.

(56) References Cited

U.S. PATENT DOCUMENTS

| | | | | |
|---|---|---|---|---|
| 3,006,673 A | * | 10/1961 | Swick | 403/122 |
| 4,386,949 A | * | 6/1983 | Bassi | 55/507 |
| 4,693,628 A | * | 9/1987 | Renk | 403/135 |
| 4,894,754 A | * | 1/1990 | Levilain | 362/528 |
| 5,290,120 A | * | 3/1994 | Osterfeld et al. | 403/133 |
| 5,443,323 A | * | 8/1995 | Prelat et al. | 403/289 |
| 5,499,570 A | * | 3/1996 | Bergelin et al. | 92/84 |
| 5,653,548 A | * | 8/1997 | Amdahl | 403/133 |
| 5,682,798 A | * | 11/1997 | Malone | 74/502.6 |
| 5,947,249 A | * | 9/1999 | Tobiasz | 192/85 C |
| 6,190,080 B1 | * | 2/2001 | Lee | 403/135 |
| 6,206,604 B1 | * | 3/2001 | Dembowsky et al. | 403/135 |
| 6,837,716 B1 | * | 1/2005 | Brazas | 439/8 |

(Continued)

FOREIGN PATENT DOCUMENTS

DE        2361194        * 12/1973

(Continued)

*Primary Examiner*—Victor MacArthur
(74) *Attorney, Agent, or Firm*—Marshall, Gerstein & Borun LLP (57) ABSTRACT

A connecting element is illustrated, suited for releasably connecting a first component and a second component, particularly for releasably connecting an actuator with a pedal of a motor vehicle, wherein forces parallel to the assembly direction are transmitted by the connecting element. The connecting element comprises a connecting mechanism which is attached to the second component and a sled, which can receive a fastening end of the first part and which latches in the connecting mechanism in its fastening position. The connecting mechanism is preferably configured in one-piece-form as a housing, wherein the sled, which is connected to the actuator, is connected to the housing in fastened condition and wherein the sled can be released by means of a tool.

12 Claims, 3 Drawing Sheets

U.S. PATENT DOCUMENTS 7,004,664 B2 * 2/2006 Gras et al. .................. 403/133

FOREIGN PATENT DOCUMENTS

| DE | 298 04 345 | 5/1998 |
| --- | --- | --- |
| DE | 19824530 | 12/1998 |
| DE | 19813721 | 10/1999 |
| DE | 19918911 | 11/2000 |
| EP | 0806577 | * 12/1997 |
| EP | 0896162 | 2/1999 |
| GB | 2235961 | 3/1991 |
| WO | WO 00/65245 | 11/2000 |

* cited by examiner

CONNECTING ELEMENT

1. TECHNICAL FIELD

The present invention relates to a connecting element for releasable connecting a first component with a second component, for instance a modulator with an operating element. In particular, the present invention relates to a connecting element for releasable connecting an actuator linkage with a pedal in a vehicle.

2. PRIOR ART

Linked and releasable connecting of two components by means of an appropriate connecting element is a problem in many fields of mechanical engineering. The construction of vehicles is such a field. Here, usually the applied force to the brake or clutch pedal and the thereby generated torque is transmitted via a movably attached linkage of bars or modulator to the brake or clutch system, respectively. Such releasable connections have the following advantages: The moving direction of the two connected components can be turned round, the transmitted torques and forces can be changed by exploiting the lever principle and the aspect of safety is taken into account by indirectly operated technical elements. Airplane construction or the general mechanical engineering are further fields of application in which releasable connections of two movable components are required.

The following essential requirements have to be fulfilled especially because of the application of connecting elements in the field of vehicle construction. In the case of using the connecting element for connecting the brake pedal with the brake linkage a stable, long wearing and lasting construction is necessary which transmits considerable cyclic loading of compressive and tensile stresses over the whole working life of a motor vehicle. The stability is realized on the one hand by cooperating positive and non-positive connections and on the other hand by using appropriate materials as for instance plastic materials with reinforcing elements.

Furthermore, it is desirable, that the connection produced by the connecting element is connectable and again releasable with low technical and time effort. This is only possible if the connecting element consists of components with limited constructive complexity. In consideration of the mentioned aspects the production costs as well as the later assembling cost during assembly and disassembly of the connecting element and the use of the connecting element, respectively, can be reduced whereby a profitable and technically useful connecting element is provided.

The prior art provides connecting elements of different embodiments which are characterized by a certain stability under load which several times exceeds the assembling force for producing the connection.

According to the document DE 198 13 721 a connecting element can comprise for instance the following arrangement. A first component has a spherical head which is received by a dome shaped sled complimentary shaped to the spherical head. During insertion or installation, respectively, of the spherical head in the sled the lateral sides of the sled in the opening region of the spherical cap are pressed apart and are closed again after the spherical head has been completely inserted into the sled. In this way a positive and a non-positive connection between the spherical head and the sled is produced. This sled comprises two resilient extensions at its outside with snapping hook-like projections at their sides opposite to the spherical head. The resilient extensions with the snapping hook-like projections provide a permanent connection and latching with a second component by engaging therein if the sled with the spherical head slides into a second component (receptacle) for producing a definitive connection. The second component circumferentially compasses the sled and prevents in that way a bending up of the dome shaped sled and a disengaging of the spherical head. The connection between sled and second component is facilitated by a suitably shaped female element in the second component. In that way, a connection with a simultaneous engaging of the connection is produced by moving the spherical head in the direction of the dome shaped sled. The connecting element withstands mechanical loads acting perpendicular to the assembling direction of the connecting element whereby these mechanical loads can by far exceed the mechanical assembling effort.

A further development of the until then known and explained connecting elements provides the document DE 199 18 911. In this connecting element the resilient extensions with a snapping hook-like projection of the sled are shaped so that they stick out on one side of the second component, i.e. project when the sled is set in and engaged in the second component. Nevertheless, the sled can be disengaged from the second component by manually pressing the projecting ends without using any additional tools. Thus, a connecting element is provided which can be manually assembled as well as released and although withstands high mechanical loading.

Furthermore, the sled provides simultaneously fastening and latching means by its dome shaped female element for the spherical head of the first component and by the resilient extensions for latching in the second component. The material of the sled is elastically deformable in order to enable the function of the resilient extensions. The mechanical deformability additionally however causes that the sled deforms under the influence of mechanical loading. Though, the sled is deformed because the mechanical loading of the connecting element acts perpendicular to the assembling direction as described above in the prior art, nevertheless that does not cause a disengagement of the spherical head from the sled and thereby a failure of the connecting element.

However, it has to be noted that only forces perpendicular to the assembling direction appear during use of the known connecting elements, described before. Strictly speaking, the load acts during the intended use substantially perpendicular to the assembling direction of the first component which is moved together with the dome shaped sled into the second component during assembling. Thus, the holding forces in assembling direction have not to be and are not high in the known connecting elements. Additionally, the construction of the known connecting elements is unsuitable for mechanical loads acting in assembling direction because their elastical deformability of the sled material would lead to a fast wear of the bearing area and therefore to a disengagement of the spherical head.

Finally, the snapping hook-like latching means perform the supporting parts of the connecting element during acting mechanical loading in assembling direction. However, these supporting areas are too small to withstand permanent tensile or tensile/compressive cyclic loading.

It is therefore the problem of the present invention to provide a connecting element for two components that permanently withstands mechanical loading parallel to the assembling direction. Thereby the connecting element is to be of simple construction and made of low-cost materials.

A further problem related to the known connecting elements and solved by the present invention is that the connecting element comprises high stability and is to be nevertheless easily releasable without negatively affecting the stability and working life.

3. SUMMARY OF THE INVENTION

The above problems are solved by the subject matter of the independent claims.

In detail, the present invention relates to a connecting element for connecting a first part and a second part comprising a connecting means connected to the second part, a sled arranged in said connecting means which is displaceable from an assembly position to a mounting position wherein said sled is configured in such a way that it can receive a fastening end of said first part and that it moveably and releasably latches said fastening end by means of a lever like tilting mechanism after displacing said sled together with said fastening end in said mounting position.

The connecting element according to the invention is made of two parts wherein preferably according to the invention one connecting means is rigidly installed in a first part or it is integrally formed within the same. For connecting the first part with a second part comprising a fastening end, according to the invention a sled is used. This sled is configured in such a way that it can receive a fastening end of the second part and that it can be fixed in said connecting means. The receiving and latching of said fastening end of said second part is carried out by means of a lever like tilting mechanism which is capable to moveably and releasably latch and fix fastening ends having different shapes and size. The mounting of said fastening end of said second part is executed by the displacement of said sled from an assembly position to a mounting position. In this mounting position, the sled is fixed in said connecting means as well as said fastening end is fixed in said sled. Without the destruction of the sled, the same can again be released from the connecting means and, thus, the whole connection between the first and the second part is also released.

According to a preferred embodiment of the present invention, the lever like tilting mechanism of the sled latches in two stages the fastening end of said first part in said mounting position by means of a first and a second lever.

Preferably according to the invention, on the one end said hollow cylindrically shaped sled comprises at least two different lever like constructions which form the basis for the two-stage tilting mechanism. These levers show a different radial extension and in this manner they realize a two stage latching of the fastening end. While displacing the sled from said assembly position in said fastening position, the lever like construction contributes to the fact that the space in which said fastening end is received is specifically made smaller and in this manner it encloses and latches said fastening end.

According to a further preferred embodiment of the present invention, said sled can receive and latch fastening ends having different shape and size.

The sled according to the invention comprises a sufficient large opening in assembly position so that fastening ends having a different shape and size can be received therein. First the displacement of the sled from said assembly position to said fastening position leads to a specifically minimizing of this opening and in this manner to an enclosing of a defined volume. In this volume, spherical, pyramidal, cubic and other conceivable structures of fastening ends can be received and, thus, effectively latched. Said latching is supported by an adaptation of the inner shape of the sled to the shape of the fastening end to be received. Accordingly, a spherically shaped fastening end and a suitably shaped sled serve for providing a connection having many degrees of freedom. A fastening end having other shapes or structures serves for example for the provision of an axial connection with no degree of freedom.

Based on a further preferred embodiment of the present invention, said lever like tilting mechanism guarantees a security release of said fastening end from said sled.

The two different lever like constructions of said lever like tilting mechanism according to the invention support within said connecting means as soon as said sled containing said fastening end has been displaced from said assembly position in said fastening position. In this fastening position, at least one of said lever like constructions acts like a spring which supports at the connecting means. The spring force of said lever like construction is defined by the material of said sled and by the size of said lever like construction. In case of a mechanical overload of said first part or collectively of the connection via said connecting element according to the invention, it is possible that said resilient lever like construction yields and that in this manner the fastening end of said first part is released from said sled. A security release of the fastening end is realized in this way.

According to a further embodiment of the present invention, said fastening end is spherically or egg shaped and said sled is complementary configured to this fastening end.

To guarantee a limited movability of said parts connected by said connecting element according to the invention, said fastening end of said first part is according to the invention egg shaped or spherically configured. The movability as well as the positive connection realized by said sled is supported in such a way that said sled is complementary configured to the shape of the fastening end of the first part.

According to a further preferred embodiment of the present invention, said sled is latched in said connecting means by means of a latching mechanism wherein said latching mechanism comprises at least two latching hooks.

The present invention further provides a connecting element for connecting a pedal and an actuator or the like comprising a connecting means connected with said pedal and a sled arranged in said connecting means which is displaceable from an assembly position to a fastening position wherein said sled can be releasably connected by means of latching and an unlatching means with said connecting means.

Preferably according to the invention, said connecting element is used for connecting a pedal and an actuator for example in the manufacture of motor vehicles. Based on the simplicity in the motor vehicle production, the modular construction is used wherein it is practically effective to connect for example a pedal and an actuator by means of the connecting element according to the invention by a few procedure steps. Preferably according to the invention, said sled is fixed in said connecting means via latching and unlatching means wherein said connecting means is in turn mounted in said pedal. Since the connection is preferably according to the invention releasable, the connecting element and, thus, the complete connection can be released for example for executing of repairs.

According to a preferred embodiment, the sled is such configured that it can receive a fastening end of said actuator and that it movably and releasably latches said fastening end by means of a lever like tilting mechanism after being displaced in said fastening position containing said fastening end.

According to a further preferred embodiment of the present invention, a wall at the end of the sled directed to said connecting means is divided in at least two lever like resilient wall portions which comprise at least one unlatching means and at least one latching means.

Preferably according to the invention, said sled is latched in said connecting means of said pedal by means of a lever like resilient wall portion. These wall portions comprise unlatching means and latching means which can be realized by different shapes. It is furthermore conceivable that the unlatching means according to the invention are releasable either manually or by means of tools.

According to a further preferred embodiment of the present invention, said latching means is formed by a snapping hook on the radial outer wall of said wall portion and said unlatching means is formed by a section of said wall portion extending beyond said snapping hook in axial direction of said sled.

By the use according to the invention of snapping hooks as latching and unlatching means, said sled is releasably mounted in said connecting means of the pedal. For realizing a space saving construction of said connecting element, said latching means are preferably according to the invention arranged at the radial outer wall of said wall portion. Said unlatching means extend beyond said snapping hook in axial direction of said sled. It is conceivable that on the one hand these unlatching means also extend beyond said connecting means in said pedal so that it can be manually released at this position. On the other hand, it is also conceivable that said unlatching means terminate with said connecting means in order to release them at this position by means of tools.

According to a further preferred embodiment of the present invention, said connecting means comprises on one side an opening for receiving said sled and on one side opposite to said opening at least two openings for receiving said wall portions of said sled as well as at least one fixing means for fixing at said pedal.

Preferably according to the invention, the edges of said openings are sharp-edged so that they support said latching means.

4. SHORT DESCRIPTION OF THE DRAWINGS

At present preferred embodiments of the present invention are exemplarily shown in the drawing:

FIG. 2(*a*) a sectional drawing of the connecting element according to the present invention corresponding to a preferred embodiment with said sled in assembly position or initial position; (*b*) a sectional drawing of the connecting element according to the invention of FIG. 2*a* with said sled in the fastening position or assembled position;

In the following, preferred embodiments of the invention are in detail described with reference to the drawing.

DETAILED DESCRIPTION OF THE INVENTION

Figure 1:
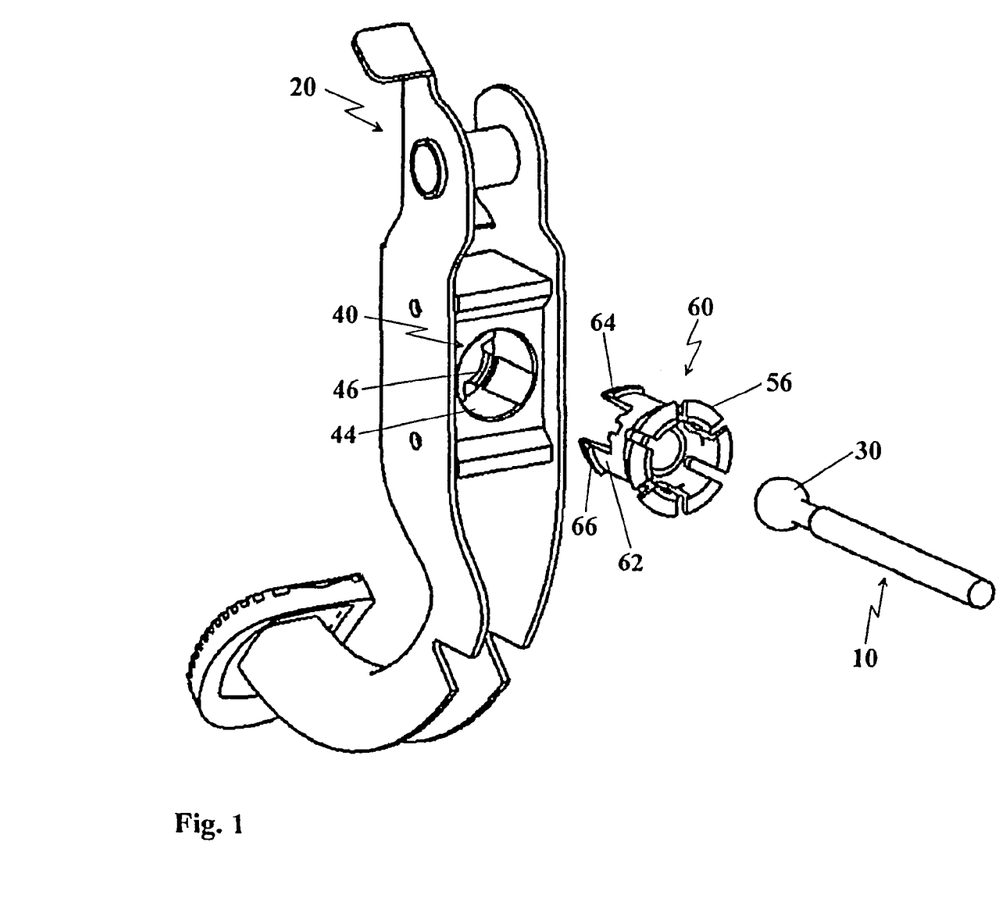
FIG. 1 the single components of the connecting element according to the present invention.

Referring to FIG. 1, the connecting element 40, 60 according to the invention for connecting a first part 10 (preferably a brake or a clutch linkage) with a second part 20 (preferably a pedal) comprises connecting means 40 and a sled 60 arranged in said connecting means 40. Said sled 60 serves for receiving a fastening end 30 of said first part 10 to be subsequently latched in said connecting means 40.

Said connecting means 40 is preferably according to the invention made of one piece and is formed by a housing 40 which is connected to said second part 20 or which is integrated therein. It is possible according to the first embodiment of the present invention to configure said connecting means 40 in such a way that it can latchably receive said sled 60.

Preferably according to the invention, said sled 60 comprises a hollow cylindrical shape having two opposed ends. The one end of said sled 60 serves for receiving and mounting said fastening end 30. The other end serves for fastening said sled 60 in said connecting means or housing 40. Preferably according to the invention, the opposed ends of said sled 60 thus have latching mechanisms which realize the respective mounting. Additionally, the connection according to the invention of said both parts 10, 20 is carried out by the cooperation of said connecting means or said housing 40 and said sled 60. By the displacement of said sled 60 from an assembly position or initial position in a fastening position or assembled position, on the one hand said sled 60 is latched in said housing 40. On the other hand, the latching of said first part 10 is realized by means of a lever like tilting mechanism which cooperates with the inner walls of an opening 44 of the housing 40.

The fastening end 30 of the first part 10 is according to a preferred embodiment spherically or egg shaped configured. Other shapes are also conceivable as for example conical, pyramidal, cubic or plane fastening ends 30. According to said preferred shapes, different connections are achieved having different degrees of freedom. For example a spherical fastening end 30 is movably connected to said sled 60 having three degrees of freedom in a solid angle α. For example, a plane shaped fastening end 30 is appropriate for realizing a connection with no degree of freedom to a correspondingly shaped sled 60. In an assembly position of said sled 60, preferably according to the invention said fastening end 30 is inserted in said sled 60. The one end of said sled 60 is furthest opened in this position so that the insertion of said fastening end 30 is relieved. Preferably according to the invention, the end of said sled 60 in which the fastening end 30 is inserted is complementary shaped to the fastening end 30.

Figure 2A:
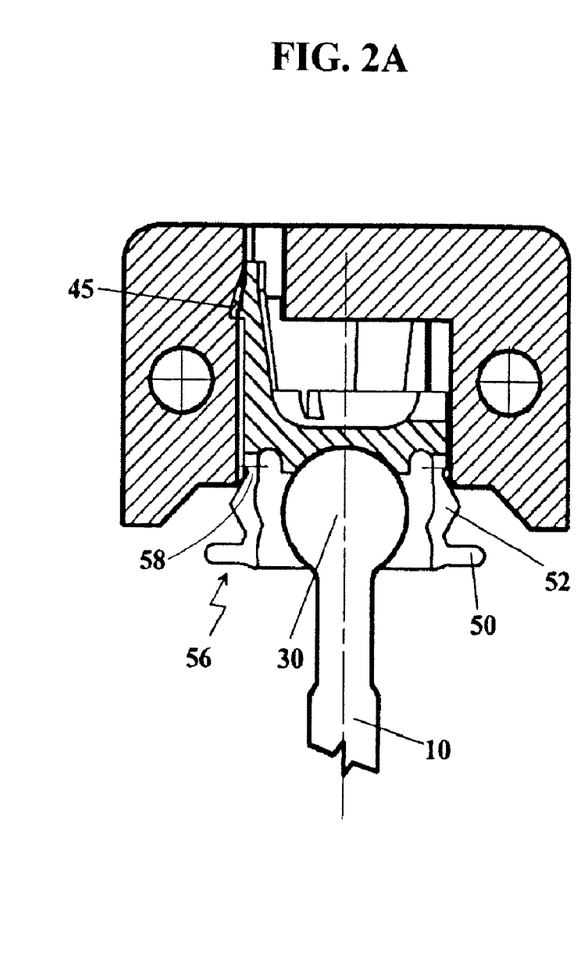
Figure 2B:
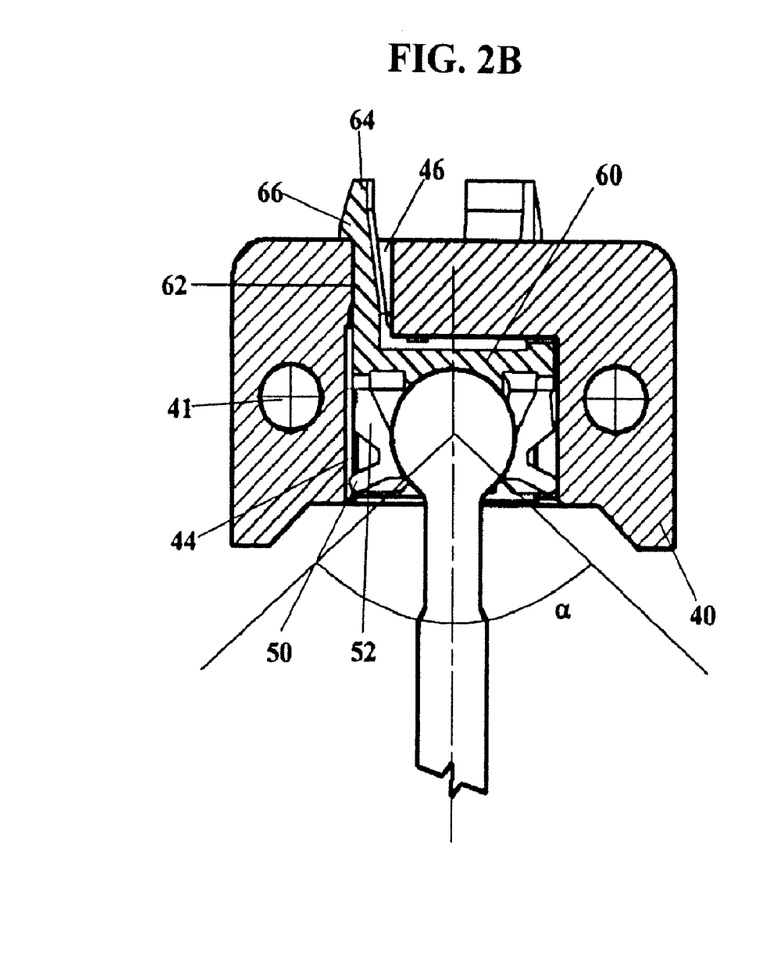

The installation of the fastening end 30 in the sled 60 in said assembly position is shown by FIG. 2*a*. The front part of the fastening end 30 is nearly completely surrounded by said sled 60. In the mounting position which is shown in FIG. 2*b*, said first part 10 is positively and non-positively and moveably in a solid angle α connected to said connecting means 40. By the movability around said solid angle α, it is possible to compensate tolerances in the orientation of said first part 10 and said second part 20 to each other without effecting the function of the connection provided according to the invention.

To facilitate the assembly of said connecting element and the provision of a connection according to a preferred embodiment of the present invention, a groove 45 is realized at the inner walls of said opening 44. Said groove 45 slightly latches said sled 60 in said assembly position or initial position. Accordingly, said sled 60 cannot fall out of said part 40 and said opening 44 which facilitates the subsequent installation of said fastening end 30 in said sled 60. After insertion of said fastening end 30 in said sled 60, said sled 60 is pushed by said fastening end 30 in the direction of said fastening position or assembled position and thus released from said slightly latching by passing said groove 45. Further pushing of said fastening end 30 realizes a final latching or clipping of said sled 60 in said housing 40 in the fastening position described below.

The end of said sled 60 for receiving said fastening end 30 comprises preferably according to the invention a lever like tilting mechanism which is formed by the lever like construction 50, 52. To this end, said hollow cylindrical wall of said sled 60 at this end is divided in at least two wall portions 56 by slots in axial direction. The number of said wall portions 56 can vary dependent on the fastening element 30 to be received so that two to eight wall portions 56 can exist.

Said wall portions 56 comprise respectively preferably according to the invention at least two lever like constructions 50, 52. Said lever like constructions 50, 52 cooperate with the inner walls of said opening 44 of said housing 40 during displacement of said sled 60 from an assembly position in a fastening position in such a way that they abut and support thereon. Thus, it is preferred according to different embodiments of the present invention to provide said opening 44 having different defined shapes for the control of insertion loads of said sled 60 containing said fastening end 30. Said opening 44 can for example be shaped cylindrically or conically. Accordingly, the sled 60 can be adapted to said opening shape if necessary. Said lever like structures 50, 52 extend according to a preferred embodiment of the present invention peripherally around said hollow cylindrical sled 60 along said wall portions 56. It is also possible to form said lever like constructions 50, 52 only in subsections of said wall portion 56. In the following, said lever like constructions 50, 52 are indicated as levers 50, 52.

Said wall portion 56 comprises preferably according to the invention respectively at least two levers 50, 52. In this context it is also conceivable that said levers 50, 52 are arranged only at every second wall portion 56 as far as the function of said connecting element is not affected thereby. The first lever 50 extends radially outwardly and it is nearly vertically oriented in view of the longitudinal axis of said sled 60. The first lever 50 serves for radially inwardly pressing the respective wall portion 56 by abutting at the inner wall of the housing 40 in the fastening position so that a positive and a non-positive connection between said fastening end 30 and said sled 60 is formed. To improve the displacement of the wall portions, each wall portion 56 comprises a tapering 58. The respective wall portion 56 supports at said fastening end 30 so that the first lever 50 is clamped between the inner wall of the housing 40 and the fastening end 30. Based on the radially inwardly directed movement of said wall portion 56 during the displacement of said sled 60 from said assembly position to said fastening position, said first lever 50 is now inclined with respect to the sled axis (see FIG. 2b).

According to a further preferred embodiment, said sled 60 comprises a second lever 52 which is arranged axially displaced from said first lever 50. Said second lever 52 also extends radially outwardly, however, not so far as said first lever 50. By the displacement of the sled 60 in the fastening position, said wall portions 56 are moved radially inwardly via said second lever 52 by means of supporting at the inner walls of the opening 44 of the housing 40. In the fastening position, it is guaranteed by means of said first 50 and said second lever 52 that possible forces are deviated via both levers 50, 52. Furthermore, an adaptation of the volume enclosed by the sled 60 at the one end to the shape of the fastening end 30 of the first part 10 is carried out by the length adaptation of the levers 50, 52.

The lever like tilting mechanism, thus, works preferably according to the invention in two stages via the first 50 and the second lever 52 which are arranged at the wall portion 56. In this context, it is also conceivable to configure a three or multistage mechanism as far as this contributes to an increase of the stability of said connecting element.

By the arrangement of said first 50 and said second lever 52 it is also possible to receive spherical and egg-shaped fastening ends 30 having different size and shape in said sled 60. The inner shape of said sled 60 is adapted to said fastening ends 30 to guarantee a reliable connection. Based on the resilient support of the first lever 50 at the inner wall of the housing 40, tolerances are compensated following from the shape and size variation of said sled 60 and said fastening end 30. Therefore, it is also possible to receive other shapes of the fastening end 30 and to sufficiently fastening the same in the sled 60 as long as they correspond to each other.

Further according to the present invention, a security release of said fastening end 30 from the sled 56 is guaranteed by the above described lever like constructions 50, 52 in case of a mechanical overload. Should said connecting element be excessively stressed by a tensile load, the fastening end 30 is released from the sled 60 against the force of pressure of the levers 50, 52. The strength of the necessary mechanical overload for security release is defined by the configuration of the levers 50, 52 and by the material of said sled 60. The levers 50, 52 thus act as a security spring which yields in case of exceeding an adjustable mechanical load value and which release the connection in this way.

Figure 3:
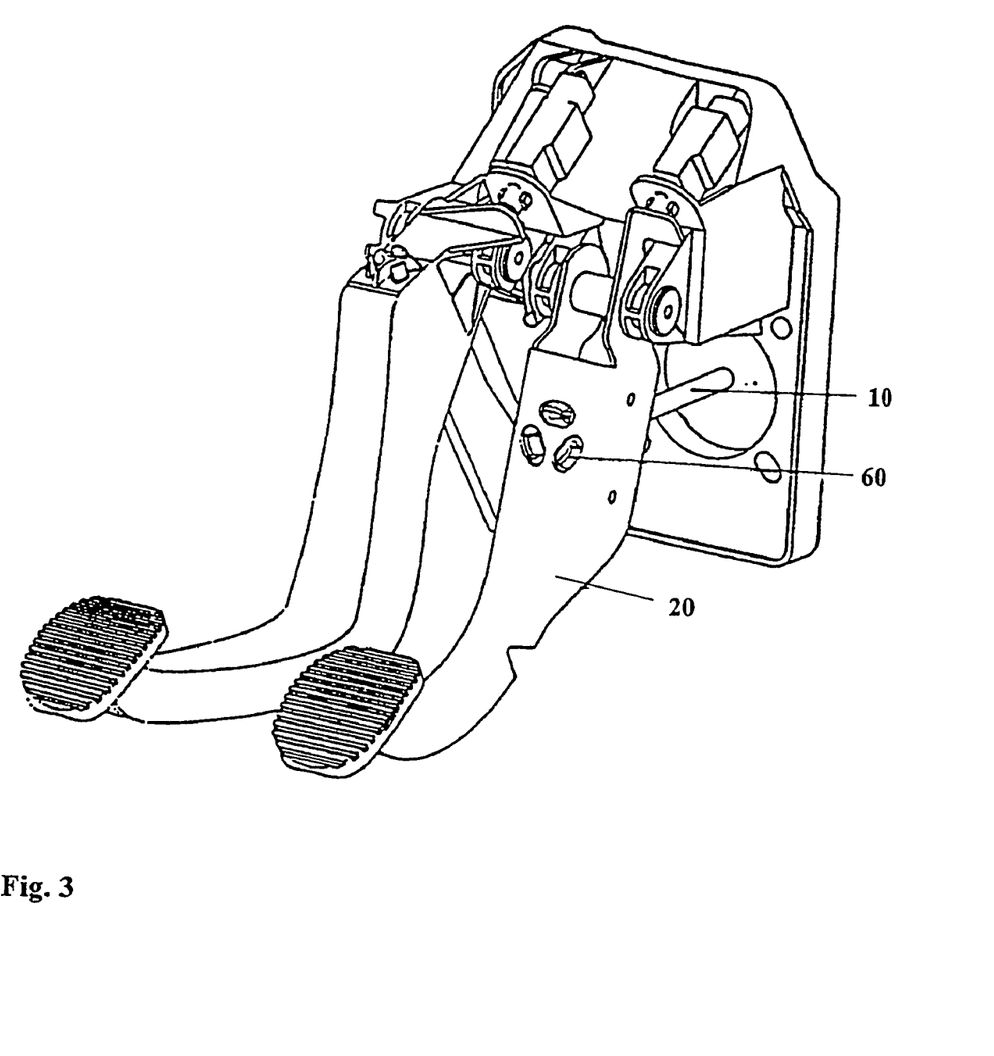
FIG. 3 a modular pedal system of a motor vehicle wherein both the brake and the clutch pedals are connected with their actuator linkages via the connecting element according to the present invention.

Furthermore, the present invention provides according to a further preferred embodiment a connecting element for releasably connecting a pedal 20 and an actuator 10, particularly in motor vehicles (see FIG. 3). The importance of such a connecting element according to the present invention follows from the fabrication of motor vehicles from single modules. For instance the brake and the clutch pedal, shown in FIG. 3, present a pedal module which is delivered to the automobile manufacture by a special supplier. For example, in order to connect the brake pedal 20 with the brake system via an actuator 10, a pedal with the releasable connecting element 40, 60 according to a further preferred embodiment is delivered. The brake system is connected with the pedal 20 via the connecting element 40, 60 and the actuator 10 wherein this connection can be again released in case of a damage or repair. The same applies for the application of the connecting element according to the invention to the clutch pedal.

The according to the invention preferred connecting element 40, 60 for connecting a pedal 20 and an actuator 10 is comprised of a one piece connecting means 40 which is formed by a housing 40 and a sled 60. Said housing 40 is rigidly connected to said pedal 20 and said sled 60 is connected to said actuator 10.

Said releasable connection between said pedal 20 and said actuator 10 is realized by said sled 60 which cooperates with said housing 40. It is however also possible to form said housing 40 directly in said pedal 20.

According to a preferred embodiment of the present invention, said sled 60 is hollow cylindrically shaped wherein at one of its ends the wall is divided in at least two lever like resilient wall portions 62. According to FIG. 2a, said wall portions 62 comprise snapping hook like projections 66 at their radial outer walls which serve as latching means 66 in the housing 40. Said snapping hook like projections 66 can vary in their shape as far as they functionally form a positive connection with the cooperating wall of the housing 40 which releasably connects the housing 40 and the sled 60.

Unlatching means 64 are formed by the extension of the wall portions 62 beyond the snapping hook like projection 66 in axial direction of said hollow cylindrically configured sled 60. Said unlatching means 64 are configured as resilient levers by means of which the snapping hooks 66 can be released from their latching position. Depending on the material from which the sled 60 is made, a tool has to be used to actuate said unlatching means 64 or it can be executed manually.

Said housing 40 comprises on one side an opening 44 for receiving said sled 60. Preferably according to the invention, said opening 44 is only as deep so that said sled 60 can be completely received therein. At the side of the housing 40 opposite to the opening 44, at least two openings 46 for receiving said wall portions 62 of said sled 60 are configured. At the sharp-edged radial outer edges of said openings 46, said latching means 66 of said sled 60 are latched. The unlatching means 64 preferably according to the invention extend beyond said housing 40 and, if necessary beyond the corresponding part of the pedal 20 so that they can be taken and operated by means of a tool or manually.

By the above described configuration of said housing 40 and said sled 60, a connection between a pedal 20 and an actuator 10 is realized which can only again be released via the operation of said unlatching means 64. For mounting said housing 40 in said pedal 20, said housing 40 comprises suitable fixing means 41.

According to a preferred embodiment of the present invention, the components of the connecting element are made of stiff plastic materials as for example polyamide. It is also possible to manufacture the single components from other materials and thereby realizing the function of a connecting element.

List of reference numbers

| | |
|---|---|
| 10 | First part, actuator |
| 20 | Second part, pedal |
| 30 | Fastening end |
| 40 | Housing, connecting means |
| 41 | Fixing means |
| 44 | Opening for receiving the sled |
| 45 | groove |
| 46 | Opening for receiving wall portions of said sled |
| 50 | First lever |
| 52 | Second lever |
| 56 | Wall portions of said sled 60 |
| 58 | Tapering |
| 60 | Sled |
| 62 | Wall portions of said sled |
| 64 | Unlatching means of said sled |
| 66 | Latching means of said sled/Snapping hook like projections |
| α | Solid angle |

The invention claimed is:

1. A connecting element for connecting a first part with a second part, the connecting element comprising:
a connecting means connectable to the second part;
a sled displaceable between an assembly position wherein a part of the sled is disposed outside the connecting means and a fastening position wherein the sled is disposed in the connecting means, the sled being configured to receive a fastening end of the first part and displacing relative to the connecting means between the assembly position and the fastening position with the fastening end received in the sled,
the sled having a tilting mechanism including a first lever extending radially outwardly relative to a longitudinal axis of the sled and a second lever extending radially outwardly relative to the longitudinal axis, the radial extension of the second lever being less than the radial extension of the first lever,
the second lever being arranged axially displaced from said first lever at said sled, such that the second lever is adapted to move inwardly and releasably engage the fastening end in a first stage of displacement of the sled relative to the connecting means to the fastening position and that the first lever is adapted to further move inwardly and releasably engage the fastening end in a second stage of displacement of the sled relative to the connecting means to the fastening position.

2. The connecting element of claim 1, wherein the sled is adapted to receive and latch fastening ends having different shapes and sizes.

3. The connecting element of claim 1, wherein the lever-like tilting mechanism is adapted to release the fastening end of the first part in response to mechanical overload.

4. The connecting element of claim 1, wherein at least a portion of the sled is adapted to receive the fastening end of the first part having an essentially spherical shape.

5. The connecting element of claim 4, wherein at least a portion of the sled has a shape complementary to that of the fastening end of the first part.

6. The connecting element of claim 1, wherein the sled includes a latching mechanism adapted to latch the sled.

7. The connecting element of claim 6, wherein the latching mechanism comprises at least two latching hooks.

8. The connecting element of claim 1, wherein:
the connecting means comprising a housing with walls defining an opening;
the first lever abuts the walls of the housing at a first location on the walls with the sled disposed in the opening; and
the second lever abuts the walls of the housing at a second location on the walls axially displaced from the first location with the sled disposed in the opening.

9. The connecting element of claim 8, wherein:
the first lever has a first end and a second end axially displaced from the first end; and
the second lever has a first end and a second end axially displaced from the first end,
the second end of the first lever is connected to the first end of the second lever.

10. A pedal assembly comprising:
an actuator having a fastening end;
a pedal; and
a connecting element for connecting the actuator with the pedal, the connecting element comprising:
a connecting means connected to the pedal;
a sled displaceable between an assembly position wherein a part of the sled is disposed outside the connecting means and a fastening position wherein a part of the sled is disposed in the connecting means, the sled being configured to receive the fastening end of the actuator and displacing relative to the connecting means between the assembly position and the fastening position with the fastening end received in the sled, the sled having a tilting mechanism including a first lever extending radially outwardly relative to a longitudinal axis of the sled and a second lever with a second pivot point extending radially outwardly relative to the longitudinal axis, the radial extension of the second lever being less than the radial extension of the first lever, the second lever being arranged axially displaced from said first lever at said sled, such that the second lever is adapted to move inwardly and releasably engage the fastening end in a first stage of displacement of the sled relative to the connecting means to the fastening position and that the first lever is adapted to further move inwardly and releasably engage the fastening end in a second stage of displacement of the sled relative to the connecting means to the fastening position.

11. A connecting element for connecting a first part with a second part, the connecting element comprising:
- a connecting means connectable to the second part, the connecting means comprising a housing with walls defining an opening;
- a sled displaceable between an assembly position wherein a part of the sled is disposed outside the connecting means and a fastening position wherein the sled is disposed in the connecting means, the sled being configured to receive a fastening end of the first part and displacing relative to the connecting means between the assembly position and the fastening position with the fastening end received in the sled,
- the sled having a tilting mechanism including a first lever extending radially outwardly relative to a longitudinal axis of the sled and a second lever extending radially outwardly relative to the longitudinal axis, the radial extension of the second lever being less than the radial extension of the first lever,
- the second lever being arranged axially displaced from said first lever at said sled, such that the second lever is adapted to move inwardly and releasably engage the fastening end in a first stage of displacement of the sled relative to the connecting means to the fastening position and that the first lever is adapted to further move inwardly and releasably engage the fastening end in a second stage of displacement of the sled relative to the connecting means to the fastening position,
- the first lever abutting the walls of the housing at a first location on the walls with the sled disposed in the opening, and the second lever abutting the walls of the housing at a second location on the walls axially displaced from the first location with the sled disposed in the opening.

12. A pedal assembly comprising:
an actuator having a fastening end;
a pedal; and
a connecting element for connecting the actuator with the pedal, the connecting element comprising:
- a connecting means connected to the pedal, the connecting means comprising a housing with walls defining an opening;
- a sled displaceable between an assembly position wherein a part of the sled is disposed outside the connecting means and a fastening position wherein a part of the sled is disposed in the connecting means, the sled being configured to receive the fastening end of the actuator and displacing relative to the connecting means between the assembly position and the fastening position with the fastening end received in the sled, the sled having a tilting mechanism including a first lever extending radially outwardly relative to a longitudinal axis of the sled and a second lever with a second pivot point extending radially outwardly relative to the longitudinal axis, the radial extension of the second lever being less than the radial extension of the first lever, the second lever being arranged axially displaced from said first lever at said sled, such that the second lever is adapted to move inwardly and releasably engage the fastening end in a first stage of displacement of the sled relative to the connecting means to the fastening position and that the first lever is adapted to further move inwardly and releasably engage the fastening end in a second stage of displacement of the sled relative to the connecting means to the fastening position, the first lever abutting the walls of the housing at a first location on the walls with the sled disposed in the opening, and the second lever abutting the walls of the housing at a second location on the walls axially displaced from the first location with the sled disposed in the opening.

* * * * *